United States Patent [19]
Hughes

[11] Patent Number: 5,107,569
[45] Date of Patent: Apr. 28, 1992

[54] TWO-PIECE SUN VISOR BUSHING AND METHOD OF USE

[76] Inventor: Daniel Hughes, 115 Plum Tree, St. Peters, Mo. 63376

[21] Appl. No.: 534,838

[22] Filed: Jun. 7, 1990

[51] Int. Cl.$^5$ .......................... B65D 55/00; B60J 3/00
[52] U.S. Cl. ......................................... 16/2; 296/97.13
[58] Field of Search .............................. 16/2, 342, 337; 296/97.9, 97.12, 97.13

[56] References Cited

U.S. PATENT DOCUMENTS

| | | | |
|---|---|---|---|
| 3,161,906 | 12/1964 | Yarm | 16/2 |
| 4,148,519 | 4/1979 | Hollar, Jr. | 296/97.13 |
| 4,757,751 | 7/1988 | Munoz. | |
| 4,953,064 | 8/1990 | Viertel et al. | 296/97.9 |

FOREIGN PATENT DOCUMENTS 2201998  9/1988  United Kingdom ................. 16/273

*Primary Examiner*—Robert L. Spruill
*Assistant Examiner*—Carmine Cuda
*Attorney, Agent, or Firm*—Rogers, Howell & Haferkamp

[57] ABSTRACT

In a vehicle sun visor assembly, a bushing apparatus comprising a pair of identical bushing half members is provided as a replacement for worn conventional one-piece sun visor bushings. The half members of the bushing apparatus are designed to be assembled over the end of a sun visor pivot rod and inserted into the hollow cavity of a sun visor mounting member to create a friction connection between the sun visor and the mounting member. The friction connection enables a vehicle operator to adjust the position of the sun visor relative to the mounting member on application of a predetermined torque to the sun visor pivot rod, and enables the mounting member to support the sun visor in its adjusted position when the applied torque is removed.

17 Claims, 1 Drawing Sheet

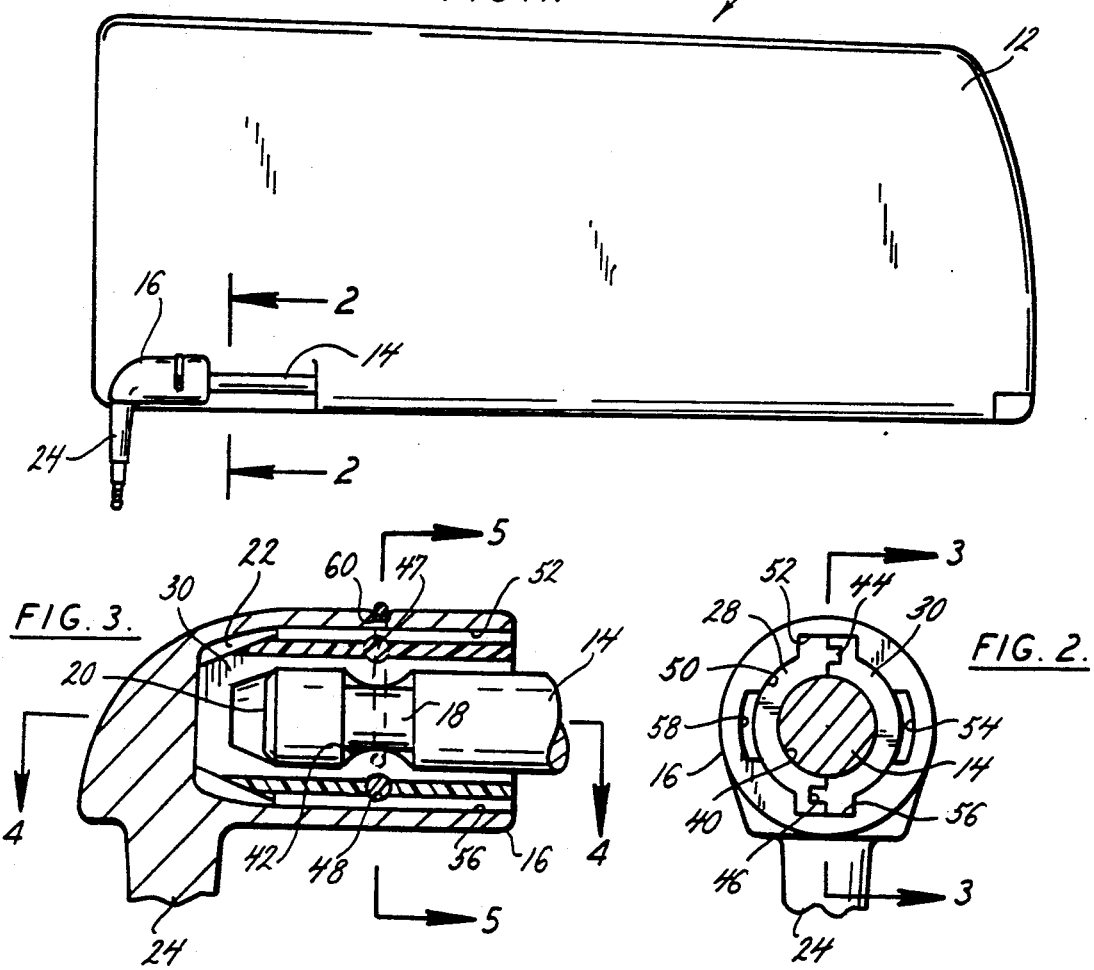
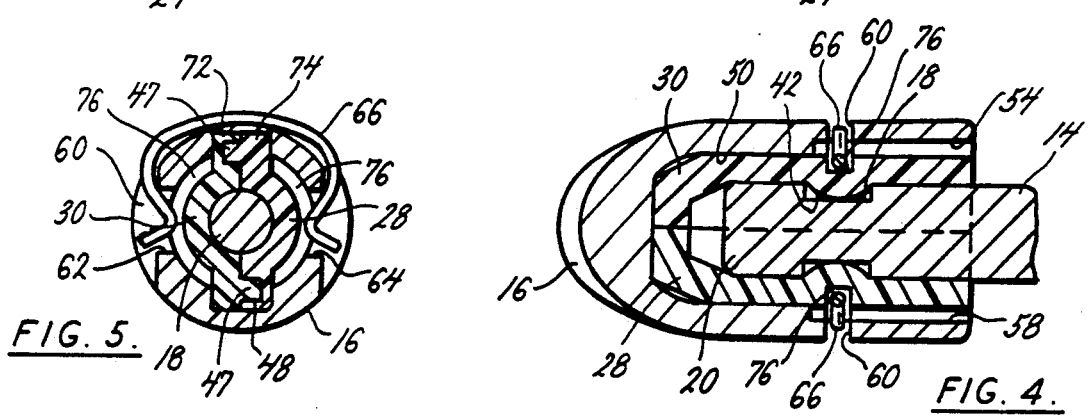
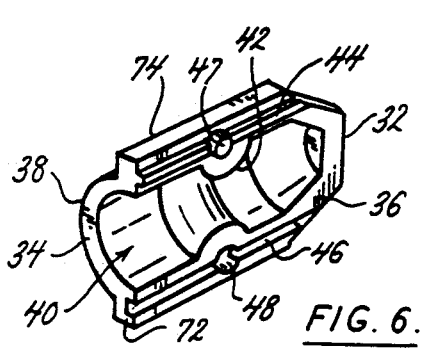
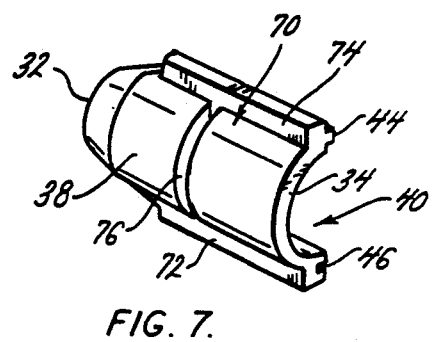

TWO-PIECE SUN VISOR BUSHING AND METHOD OF USE

BACKGROUND OF THE INVENTION

1. Field of the Invention

The present invention relates to a bushing assembly for vehicle sun visors, in particular a two-piece bushing that replaces conventional one-piece sun visor bushings that have been worn out by their continued use over a period of time.

2. Description of the Related Art

Sun visor bushings of the type provided by the present invention are commonly produced as one-piece bushings. These bushings are used in conventional vehicle sun visor assemblies that commonly include a sun visor having a pivot rod extending from one end, and a mounting member or connector that pivotally mounts the sun visor to the interior of the vehicle in a position just above the vehicle windshield.

The conventional one-piece bushing is assembled onto the end of the pivot rod that projects from the vehicle sun visor. The rod and the attached bushing are then inserted into a hollow cavity of the mounting member. One method of assembling the one-piece bushing on the sun visor pivot rod end involves heating the bushing at this point of its assembly, to cause the bushing to soften and conform to the shape of the pivot rod end. This ensures a tight connection between the bushing and the pivot rod end, and produces the needed friction engagement between the rod end and the bushing interior that enables the bushing to hold the sun visor in a variety of adjusted positions in front of the vehicle windshield. The mounting member, with the attached sun visor, is then mounted to the vehicle interior in a manner that permits the sun visor to be pivoted between a first position above the vehicle windshield, and a second position above the driver's side door window. In either of these two adjusted positions of the sun visor mounting member, the permanent friction connection between the one piece bushing and the pivot rod end of the sun visor enables the visor to be adjusted by the vehicle operator through a variety of positions in front of either the vehicle windshield or door window. The friction connection between the bushing and the sun visor pivot rod enables the visor to be moved to, and remain in, the variety of adjusted positions.

During the useful life of a vehicle, the operator of the vehicle will make frequent adjustments to the position of the vehicle sun visor. Each adjustment of the sun visor tends to wear down the friction engagement between the visor bushing and the visor pivot rod end. Once the friction connection between the one-piece bushing and the sun visor pivot rod is worn smooth, the bushing is no longer capable of holding the visor in an adjusted position, and the visor will hang down loosely in front of the vehicle windshield.

In the past, once the friction connection between the sun visor pivot rod and the one-piece bushing was worn to the extent that the bushing was no longer capable of supporting the visor in an adjusted position, the entire sun visor assembly, including the visor and the mounting member, were disassembled from the vehicle and replaced by a new assembly. Replacing the entire visor assembly was necessary because of the difficulty of replacing the worn, one-piece bushing connecting the visor pivot rod to the visor mounting member. This was primarily due to the difficulty involved in forming the replacement bushing on the pivot rod by heating the bushing on the rod end. The heating process was necessary to obtain the required close friction engagement between the bushing and rod end that enables the bushing to hold the sun visor in an adjusted position. Heating the one-piece bushing on the rod end was difficult to perform away from the facilities of the manufacturer, and it became accepted practice to replace the entire visor assembly rather than attempt to repair the assembly.

It is an object of the present invention to overcome the disadvantages associated with conventional vehicle sun visor assemblies by providing a plastic bushing apparatus that replaces worn out one-piece bushings of sun visor assemblies without the need for molding the bushing on the rod end by heating.

It is a further object of the present invention to provide a replacement bushing apparatus for a conventional one-piece sun visor bushing that is fabricated from a minimum number of parts, is of simple construction, and is quickly and easily assembled into a conventional vehicle sun visor assembly.

It is a still further object of the invention to provide a plastic bushing replacement apparatus for conventional one-piece bushings of vehicle sun visor assemblies that is economically manufactured.

Further objects and features of the present invention will become apparent to one skilled in the art upon consideration of the following specification, drawings and claims.

BRIEF DESCRIPTION OF THE DRAWINGS

FIG. 1 is an elevation view of a typical vehicle sun visor assembly that makes up the operative environment of the present invention;

FIG. 2 is an elevation view in section of the two-piece bushing assembly of the present invention taken along the line 2—2 of FIG. 1;

FIG. 3 is a side elevation view in section of the two-piece bushing of the present invention taken along the line 3—3 of FIG. 2;

FIG. 4 is a plan view in section of the two-piece bushing of the present invention taken along the line 4—4 of FIG. 3;

FIG. 5 is an elevation view in cross-section of the two-piece bushing of the present invention taken along the line 5—5 of FIG. 3;

FIG. 6 is a prospective view of an interior side of a half bushing member of the present invention; and FIG. 7 is a prospective view of an exterior side of a half bushing member of the present invention.

DESCRIPTION OF THE PREFERRED EMBODIMENT

FIG. 1 shows a conventional vehicle sun visor assembly 10 that makes up the operative environment of the present invention. It should be understood that the disclosure of the sun visor assembly shown in FIG. 1 is intended to be only illustrative of one operative environment of the two-piece bushing apparatus of the present invention, and none of the component parts of the visor assembly itself make up a part of this invention. Sun visor assemblies such as that shown in FIG. 1 are known in the art, and sun visor assemblies employing component parts similar to those employed by the assembly of FIG. 1 are also known in the prior art. The two-piece bushing apparatus of the present invention is equally well adapted to use with sun visor assemblies employing component parts similar to those shown in FIG. 1. It should also be understood that the two-piece bushing apparatus of the present invention is equally well suited to use in environments other than vehicle sun visor assemblies where a two-piece replacement bushing apparatus is needed.

The vehicle sun visor assembly 10 shown in FIG. 1 is comprised of a manually adjusted sun visor 12, a pivot rod 14 extending from one side of the visor, and a visor mounting member 16 that is pivotally connected with the pivot rod 14 and mounts the sun visor assembly 10 in the interior of a vehicle.

The visor pivot rod 14 of this particular illustrative example of a sun visor assembly is substantially cylindrical, and is provided with a groove 18 extending around its circumference adjacent its distal end 20. The groove 18 provides a means of permanently securing the conventional one-piece visor bushing (not shown) to the end of the pivot rod. In assembling a conventional one-piece bushing on the end of the pivot rod 14, the bushing would be heated at one point of its assembly to conform the bushing interior to the shape of the rod groove 18, thereby permanently attaching the bushing to the end of the rod.

The visor mounting member 16 is provided with a hollow cavity 22 at one end. The cavity 22 is dimensioned to receive and hold the conventional bushing molded on the end of the visor pivot rod 14, thereby pivotally mounting the sun visor 12 on the mounting member 16. The opposite end of the mounting member 16 is provided with a pivot shaft 24. After assembling the one-piece bushing on the end of the visor pivot rod, and then assembling the pivot rod and attached bushing inside the cavity of the mounting member 16 and heating the bushing to conform it to the shape of the rod end and cavity, the entire sun visor assembly 10 would then be mounted in the interior of a vehicle by inserting the pivot shaft 24 of the mounting member 16 in a complementary fitting (not shown) provided for the sun visor assembly in the interior of the vehicle. With the mounting member pivot shaft 24 mounted in its predetermined position in the interior of the vehicle, the mounting member 16 is capable of pivoting the sun visor 12 between a first position above the windshield of the vehicle, and a second position above the window of the driver side door. In both the first and second pivot positions of the sun visor 12, the friction connection between the mounting member 16 and the visor pivot rod 14 created by the one-piece bushing enables the sun visor 12 to be moved manually downward to adjustably position the visor in a desired position in front of either the windshield or the driver's door window.

The two-piece bushing apparatus of the present invention performs substantially the same function as the conventional one-piece bushing. The two-piece bushing apparatus establishes a friction connection between the visor pivot rod 14 and the mounting member 16 that enables the sun visor 12 to remain in an adjusted position in front of either the vehicle windshield or driver's side door window without hanging down loosely in front of either the windshield or window.

The two-piece bushing apparatus of the present invention is generally comprised of a pair of bushing half members 28, 30 that are substantially identical to each other. The bushing half members are best seen in FIGS. 6 and 7. Each half member has a forward end 32, a rearward end 34, an interior side 36, and an exterior side 38. A trough or channel 40 is formed in the interior side 36 of the half members. The trough 40 extends through the interior side from just behind the forward end 32 of the half member, and exits from the rearward end 34 of the half member. The trough 40 has a surface configuration that is shaped to complement and engage over a portion of the circumferential surface of the pivot rod end in the area of the groove 18. In the preferred embodiment, each trough 40 is shaped to engage over one half of the circumferential surface of the pivot rod end 14. It should be understood that in other embodiments of the invention employing more than a pair of bushing members, the trough configuration will be accordingly designed to engage over a fraction of the circumferential surface of the pivot rod end corresponding to the number of bushing members to be assembled over the pivot rod end. In the illustrative embodiment, the trough 40 of the bushing half members has a semi-circular shape that is dimensioned to seat over one-half of the cylindrical circumferential surface of the pivot rod end 14. Intermediate the trough 40 is a ridge or lip 42 that projects out from the trough surface. The ridge 42 traverses the trough 40, extending from one side of the trough to the other The shape of the ridge 42 surface is configured to seat within one-half of the groove 18 provided on the end of the visor pivot rod 14.

The engagement of the ridge 42 in the groove 18 prevents the bushing half members 28, 30 from being pulled axially from the end of the visor pivot rod 14 when assembled over the end of the rod. The engagement of the surface of the trough 40 and the surface of the ridge 42, with the surface of the pivot rod end 14 and the surface of the pivot rod groove 18 respectively, provide a friction engagement between the bushing half members 28, 30 and the pivot rod end 14 when the half members are assembled over the end of the pivot rod. The friction engagement between the bushing half members 28, 30 and the pivot rod end 14 will hold the pivot rod 14 stationary relative to the half members 28, 30 when the sun visor 12 is set in a desired position. Moreover, the friction engagement between the troughs 40 of the bushing half members 28, 30 and the pivot rod end 14 is such that the pivot rod 14 will rotate relative to the half members 28, 30 when a predetermined amount of torque is exerted on the rod end 14 by the vehicle operator manually adjusting the position of the sun visor 12. Once the sun visor is set in a desired position, the friction engagement between the troughs of the half members 28, 30 and the pivot rod end 14 will hold the sun visor 12 in its adjusted position.

The interior side 36 of each of the bushing half members 28, 30 is also provided with a tongue 44 and a groove 46. The tongue and groove 44, 46 extend axially along the interior side 36 of each bushing half member parallel to and on opposite sides of the trough 40. The tongue 44 of each half member is dimensioned to be inserted in and received by the groove 46 of an opposing half member to orient the half members correctly relative to each other when the half members 28, 30 are assembled over the end of the sun visor pivot rod 14. As seen in the drawing figures, a post 47 and a post hole 48 are also provided on the interior side 36 of the bushing half members. The post 47 and post hole 48 are formed as part of the tongue 44 and groove 46, respectively, and are also provided to orient the half members correctly relative to each other when the half members are assembled together over the pivot rod end. In variants of this structure, the tongue 44 and groove 46 along may be employed on the half members, or the post 47 and post hole 48 along may be employed on the half members. As is best seen in FIG. 2, when the pair of bushing half members 28, 30 are assembled over the end of the sun visor pivot rod 14, the tongues 40 of each half member will engage in the grooves 46 of the opposing half member, and the surfaces of the troughs 40 and ridges 42 of the opposing half members 28, 30 will engage in surface friction contact with the circumferential surface of the pivot rod end 14 and the pivot rod groove 18.

The above described construction of the interior sides of the pair of bushing half members 28, 30 of the bushing apparatus of the present invention enables the half members to be easily assembled over the end of the pivot rod 14, and establish a friction connection between the surfaces of the half member troughs 40 and the circumferential surface of the pivot rod end 14. As stated earlier, the friction connection between the bushing half members and the pivot rod end enables the half members to hold the pivot rod end 14 stationary relative to the half members, yet permits the pivot rod end 14 to be rotated relative to the bushing half members 28, 30 when a predetermined torque is exerted on the rod 14 by a vehicle operator adjusting the sun visor position.

With the pair of bushing half members 28, 30 assembled over the sun visor pivot rod end 14, the bushing apparatus of the present invention is ready to be inserted into the hollow cavity 22 of the sun visor mounting member 16. In the disclosed illustrative embodiment of the invention, the exterior side 36 of each bushing half member 28, 30 is configured to complement the interior surface of the mounting member cavity 22. It should be understood by those skilled in the art, that the exterior side 38 of each of the bushing half members 28, 30 may be altered to enable the bushing apparatus of the present invention to be used with a mounting member similar to that disclosed in the illustrative example, yet having a hollow cavity with an interior surface shaped differently than that disclosed in the illustrative example.

In the illustrative example of the operative environment of the present invention, the sun visor mounting member 16 has a hollow cavity 22 with an interior surface 50 that is substantially cylindrical. Spatially arranged around the interior surface 50 of the mounting member cavity 22 are four slots 52, 54, 56, 58 that are formed in the interior surface 50 of the cavity 22 and extend axially along the interior surface. Outside the hollow cavity 22 of the mounting member 16, a transverse groove 60 is cut into the exterior surface of the mounting member 16. The groove 60 extends partially around the circumference of the mounting member 16, and is oriented perpendicular to the axis of the hollow cavity 22. At opposite ends of the groove 60 are cut slots 62, 64 that extend through the walls of the mounting member 16 and communicate the opposite ends of the groove 60 with the hollow cavity 22. A horseshoe shaped snap ring 66 is provided with the mounting member 16, to be engaged over the circumferential surface of the mounting member in the transverse groove 60. Opposite ends of the snap ring 66 are shaped to extend through the slots 62, 64 provided at the opposite ends of the groove 60, and protrude into the hollow cavity 22 of the mounting member 16.

As stated earlier, the exterior sides 38 of the bushing half members 28, 30 of the present invention are configured to complement the interior surface 50 of the cavity of the sun visor mounting member 16 described above. The exterior side of each bushing half member is generally configured as a half cylinder or semi-circular expanse 70. The expanse 70 is provided with flanges 72, 74 at its opposite sides. The flanges 72, 74 extend parallel to the axes of the expanse 70 and trough 40 of each half member. The tongue and grooves 44, 46 provided on the interior sides 36 of the half members are formed on the interior sides of the pair of flanges. A locking groove 76 is provided intermediate the expanse 70 of the bushing half members. The locking groove 76 extends between the flanges 72, 74 on the opposite sides of the half members, and is positioned transverse to the axes of expanse 70 and the trough 40 of the half members.

With the pair of bushing half members 28, 30 of the bushing apparatus assembled over the end of the sun visor pivot rod 14, the tongues 44 engage in the grooves 46 of the half members and the opposing flanges 72, 74 of each of the bushing half members come together to form a pair of assembled flanges. The pair of assembled flanges 72, 74 extend axially over the exterior surface of the bushing apparatus, on opposite sides of the semi-circular expanses 70 of the apparatus. The assembled flanges formed by the mating opposing flanges 72, 74 are dimensioned to be received within the pair of slots 52, 56 formed in the interior surface 50 of the mounting member hollow cavity 22. By inserting the bushing half members 28, 30, assembled over the end of the sun visor pivot rod 14, into the hollow cavity 22 of the mounting member 16, the mating opposed flanges 72, 74 are slidably received in the slots 52, 56. This engagement of the opposed flanges in the slots formed in the hollow cavity 22 of the mounting member holds the pair of bushing half members 28, 30 in tight friction engagement around the pivot rod end 14. The engagement of the flanges in the slots also hold the half members stationary relative to the mounting member, and prevents relative rotation between the half members and the mounting member.

With the pair of bushing half members 28, 30 fully inserted into the hollow cavity of the mounting member, the locking grooves 76 of the half members are positioned beneath the transverse groove 60 formed around the mounting member 16. By inserting the snap ring 66 over the exterior surface of the mounting member 16 and in the transverse groove 60, the opposite ends of the snap ring 66 project through the slots 62, 64 formed in the opposite ends of the transverse groove 60, and engage in the locking grooves 76 formed in the exterior sides 38 of the bushing half members. The engagement of the opposite ends of the snap ring 66 in the locking grooves 76 of the half members secures the bushing apparatus axially within the hollow cavity 22 of the mounting member. With the snap ring in place the bushing apparatus cannot be axially removed from the cavity 22 without first removing the snap ring 66.

With the bushing half members 28, 30 of the bushing apparatus of the present invention assembled over the end of the sun visor pivot rod 14 and inserted into the hollow cavity 22 of the sun visor mounting member 16, the bushing half members 28, 30 provide a friction engagement between the pivot rod 14 and the mounting member 16. The friction engagement will support the sun visor 12 in an adjusted position relative to the mounting member 16, and will permit rotative adjustment of the sun visor pivot rod 14 relative to the mounting member 16 upon the application of a predetermined torque to the pivot rod 14.

From the description of the bushing apparatus and its assembly in a conventional sun visor assembly described above, it should be clear that the bushing apparatus of the present invention provides an inexpensive replacement part for repairing worn, one-piece bushings commonly used in conventional vehicle sun visor assemblies. Replacing a worn out one-piece bushing with the bushing apparatus of the invention permits sun visor assemblies to be repaired rather than disposed of and replaced. In the preferred embodiment of the invention, the bushing half members of the bushing apparatus are constructed of inexpensive plastic resins, although other materials may be employed. Employing a pair of parts that are identical to each other reduces the costs involved in producing the apparatus.

While the present invention has been described by reference to a specific embodiment, it should be understood that modifications and variations of the invention may be constructed without departing from the scope of the invention defined in the following claims.

I claim:

1. A method of replacing a one-piece bushing in a bushing mounting assembly comprising a pivot rod having a rod end adapted to have the one-piece bushing attached thereon, and a mounting member having a hollow cavity at one end adapted to receive the one-piece bushing mounted on the rod end to rotatably mount the pivot rod on the mounting member, the method including:

removing the pivot rod end, with the one-piece bushing attached thereon, from the cavity of the mounting member;

removing the one-piece bushing from the rod end;

providing at least two replacement bushing members with first and second sides, the first side of each bushing member having a trough formed therein, and the second side of each bushing member having an exterior surface shaped to complement a portion of an interior surface of the mounting member cavity;

assembling the bushing members on the end of the pivot rod by seating the trough formed in the first side of each bushing member in surface engagement over a portion of the rod end circumferential surface; and assembling the bushing members in the hollow cavity of the mounting member by inserting the bushing members assembled over the rod end into the cavity, thereby nesting the exterior surfaces of the bushing members in surface engagement with the interior surface of the mounting member cavity, and thereby causing the troughs formed in the first sides of the bushing members assembled in the cavity to frictionally engage over the circumferential surface of the end of the pivot rod to hold the rod stationary relative to the bushing members, and to enable relative rotation between the pivot rod and bushing members upon application of a predetermined torque to the rod.

2. In a vehicle sun visor assembly including a sun visor having a pivot rod that extends axially through the visor and terminates at one end projecting from the visor, the one end having a circumferential surface and an end face, and a visor mounting member secured adjacent a vehicle windshield and having a cylindrical cavity extending axially into the mounting member for receipt of the pivot rod one end, a bushing apparatus for assembly onto the pivot rod one end and axial insertion into the mounting member cavity, the apparatus comprising:

a pair of bushing members, the bushing members being substantially identical to each other, each bushing member of the pair having a first and a second side and a forward end and a rearward end;

the first side of each bushing member having a plane surface formed thereon, the plane surface having a cylindrical projection formed thereon and having a cylindrical recess and a trough formed therein, the plane surface completely surrounding the cylindrical projection and the cylindrical recess, the cylindrical projection of each bushing member being insertable into the cylindrical recess of the other bushing member to prevent relative longitudinal and lateral movement between two bushing members, the trough being provided to seat in surface engagement over substantially one half of the circumferential surface of the one end of the pivot rod and the forward end of each bushing member being formed to cover over substantially one half of the end face of the one end of the pivot rod; and, the second side of each bushing member being formed to nest in surface engagement with substantially one half of an interior surface of the cavity of the mounting member.

3. The apparatus of claim 2, wherein:
   the forward end of each bushing member is tapered to facilitate axial insertion of the bushing members into the mounting member cavity.

4. The apparatus of claim 2, wherein:
   the second side of each bushing member is formed with a pair of axial flanges, the pairs of flanges engage each other with the bushing members seated over the one end of the pivot rod, and the pair of flanges are held in engagement by the mounting member cavity when the bushing members are seated over the one end of the pivot rod and are axially inserted into the mounting member cavity.

5. The apparatus of claim 2, wherein:
   the forward ends of the bushing members engage each other with the bushing members seated over the one end of the pivot rod.

6. In a vehicle sun visor assembly including a sun visor with a pivot rod end projecting from one side, and a visor mounting member adapted to be secured above a vehicle windshield and having a hollow cavity for the insertion of the visor pivot rod end, a bushing apparatus for assembly on the pivot rod end and insertion into the mounting member cavity, the apparatus comprising:

at least two bushing members, each bushing member having a first end and second side;

the first side of each bushing member having a projection formed thereon and a recess and trough formed therein, the projection and recess being positioned on opposite sides of the trough, the projection being formed as a tongue and the recess being formed as a groove, the tongue and groove extending axially along the opposite sides of the trough, each trough extending axially along the first side of the bushing member, each trough being adapted to seat in surface engagement over a portion of the rod end circumferential surface; and the second side of each bushing member having an exterior surface shaped to complement a portion of an interior surface of the mounting member cavity, and to nest in surface engagement against the portion of the interior surface.

7. The bushing apparatus of claim 6, wherein:
the first sides of the bushing members are adapted to be assembled together over the end of the pivot rod, with the troughs of the half members in surface engagement with the circumferential surface of the pivot rod end.

8. The bushing apparatus of claim 7, wherein:
the second sides of the bushing members are adapted to be inserted into the cavity of the mounting member while the bushing members are assembled over the end of the pivot rod, with the exterior surfaces of the bushing members in surface engagement with the interior surface of the mounting member cavity.

9. The bushing apparatus of claim 6, wherein:
the troughs formed in the first sides of the bushing members are adapted to frictionally engaged with the end of the pivot rod to hold the rod stationary relative to the bushing members, and to enable relative rotation between the pivot rod and the bushing members upon application of a predetermined torque to the rod.

10. The bushing apparatus of claim 6, wherein:
the exterior surfaces of the bushing members are friction surfaces adapted to frictionally engage within the cavity of the mounting member and hold the bushing members stationary relative to the mounting member.

11. The bushing apparatus of claim 6, wherein:
the bushing members include a pair of bushing members that are substantially identical.

12. The bushing apparatus of claim 6, wherein:
the pivot rod end has a groove extending around its circumference, and the troughs of each bushing member are traversed by a ridge adapted to engage in the groove.

13. The bushing apparatus of claim 6, wherein:
the exterior surface of each bushing member includes a flange that extends axially over the exterior surface parallel with the trough, the flanges are adapted to engage within the cavity of the mounting member and hold the bushing members stationary relative to the mounting member.

14. In a vehicle sun visor assembly including a sun visor with a pivot rod end projecting from one side, and a visor mounting member adapted to be secured above a vehicle windshield and having a hollow cavity for the insertion of the pivot rod end, a bushing apparatus for assembly on the pivot rod end and insertion into the mounting member cavity, the apparatus comprising:
first and second bushing half members, each half member having a forward and rearward end and an interior and exterior side;
the interior side of each half member having a projection formed thereon and a recess and trough formed therein, the projection and recess being positioned on opposite sides of the trough, the projection being formed as a tongue and the recess being formed as a groove, the tongue and groove extending axially along the opposite sides of the trough, each trough extending axially along the interior side of the half member and out the rearward end, each trough being adapted to seat in surface engagement over one half of the rod end circumferential surface;
the exterior side of each half member having a surface configuration shaped to complement one half of an interior surface of the mounting member cavity, and nest in surface engagement within one half of the mounting member cavity; and
the first and second bushing half members being adapted to be assembled in mutually confronting positions over the end of the pivot rod with the troughs of the half members in surface engagement with the circumferential surface of the pivot rod end, and being adapted to be inserted into the cavity of the mounting member while assembled over the end of the pivot rod with the exterior sides of the half members in surface engagement with the interior surface of the mounting member cavity.

15. The bushing apparatus of claim 14, wherein:
the first and second bushing half members are substantially identical.

16. The bushing apparatus of claim 14, wherein;
the troughs formed in the interior sides of the bushing members are adapted to seat in friction engagement over the circumferential surface of the pivot rod end to hold the rod stationary relative to the bushing members, and to enable relative rotation between the pivot rod and the bushing members upon application of a predetermined torque to the rod.

17. The bushing apparatus of claim 14, wherein:
the exterior sides of the bushing members include friction surfaces adapted to frictionally engage with the interior surface of the mounting member cavity and hold the bushing members stationary relative to the mounting member.

* * * * *